United States Patent Office 3,711,491
Patented Jan. 16, 1973

3,711,491
5-CHLORO-3-OXO-1,2,4-THIADIAZOLINES
Gerhard Zumach, Cologne, Hans Holtschmidt, Leverkusen-Schlebusch, and Engelbert Kuhle, Bergisch Gladbach, Germany, assignors to Farbenfabriken Bayer Aktiengesellschaft, Leverkusen, Germany
No Drawing. Filed Jan. 21, 1970, Ser. No. 4,759
Claims priority, application Germany, Feb. 13, 1969,
P 19 07 116.0
Int. Cl. C07d 91/10
U.S. Cl. 260—302 D          18 Claims

ABSTRACT OF THE DISCLOSURE

Chlorothiadiazolines are prepared by reacting a mixture of an isocyanate and an isothiocyanate with chlorine at a temperature of from −20 to +100° C. The compounds produced by the process are useful as herbicides and fungicides.

---

It has been found that chlorothiadiazolinones can be obtained by reacting a mixture of an isocyanate and an isothiocyanate of the general formula:

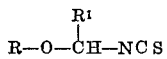

in which

R represents an optionally halogen-substituted alkyl, cycloalkyl or aralkyl radical, and
$R^1$ represents hydrogen, an alkyl or halogenoalkyl radical, or a phenyl radical optionally substituted by one or more lower alkyl or alkoxy groups and/or halogen atoms, with elementary chlorine or a chlorine donor at a temperature of from −20° C. to about +100° C., optionally in the presence of an inert organic solvent.

R and $R^1$ are preferably alkyl radicals with from 1 to 18 carbon atoms. Suitable cycloalkyl radicals include those with from 5 to 7 carbon atoms in the ring system whilst suitable aralkyl radicals include those with from 1 to 4 carbon atoms in the aliphatic chain and whose aromatic radical is preferably a phenyl or naphthyl radical. Preferred halogens include chlorine and bromine.

Since in the process according to the invention the radical:

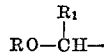

is split off, readily available isothiocyanates are generally preferred for use in the reaction.

The isothiocyanates of the formula set out above used in accordance with the invention are known and can be obtained by known processes. Examples of these isothiocyanates include methoxymethyl isothiocyanates, ethoxymethyl isothiocyanate, isopropoxymethyl isothiocyanate, dodecyloxymethyl isothiocyanate, 2-chloroethoxymethyl isothiocyanate, 2 - bromoethoxymethyl isothiocyanate, 2,2,2-trichloroethoxymethyl isothiocyanate, 4-chlorobutoxymethyl isothiocyanate, cyclohexyloxymethyl isothiocyanate, benzyloxymethyl isothiocyanate, 1-methoxyethyl isothiocyanate, 1-ethoxyethyl isothiocyanate, 1-methoxy-2,2,2-trichloroethyl isothiocyanate, α-methoxybenzyl isothiocyanate and 3-chloro-4-methyl-α-propoxy-benzyl isothiocyanate.

The isocyanates used in accordance with the invention are also known [cf. for example Liebig's Annalen der Chemie, 562, page 75 et seq. (1949)]. It is preferred to use isocyanates of the general formula:

in which $R^2$ is either the same as R or represents an optionally substituted aryl radical.

Preferred aryl radicals include the phenyl or naphthyl radical. Suitable substituents of the aryl radical include nitro groups, halogen atoms (preferably chlorine and bromine), alkyl groups with from 1 to 12 carbon atoms, halogenoalkyl groups (preferably lower halogenoalkyl groups, especially with chlorine and/or fluorine as halogen, for example trichloromethyl and trifluoromethyl), and alkoxy groups, preferably with from 1 to 4 carbon atoms.

The following are examples of such isocyanates: methyl isocyanate, ethyl isocyanate, dodecyl isocyanate, i-propyl isocyanate, 2-chloroethyl isocyanate, cyclohexyl isocyanate, benzyl isocyanate, phenyl isocyanate, 4-nitrophenyl isocyanate, 4-chlorophenyl isocyanate, 4-bromophenyl isocyanate, 4-ethoxyphenyl isocyanate, 3,4-dichlorophenyl isocyanate, 4-trifluoromethyl-phenyl isocyanate, 3-chloro-4-trifluoromethyl-phenyl isocyanate, 3-methyl-4-chlorophenyl isocyanate, 1-naphthyl isocyanate.

The process is illustrated by reference to the example of the reaction of equimolar amounts of methoxymethyl isothiocyanate and phenyl isocyanate with chlorine:

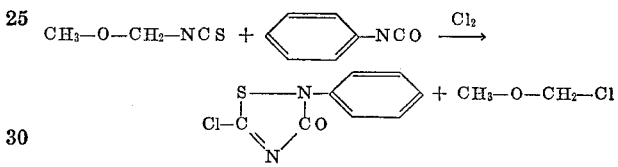

The process is generally carried out at a temperature of from about −20° to about 100° C., and preferably at a temperature of from 0 to 30° C., optionally in the presence of an inert organic solvent. The process is preferably carried out with chlorine as the chlorinating agent, although chlorine donors, for example sulphuryl chloride and phosphorus pentachloride, may also be used. Suitable inert organic solvents include any solvents that cannot be chlorinated under the reaction conditions, for example methylene chloride, chloroform, chlorobenzene, dichlorobenzene or preferably carbon tetrachloride. The reaction products are usually formed in high yields as compounds that are substantially insoluble in carbon tetrachloride. They are generally obtained in analytically pure form.

It is prefered to use the isocyanate and isothiocyanate in substantially equivalent qauntities, i.e. about 1 mol of isothiocyanate per mol of isocyanate. 1 mol of chlorine should preferably be available for 1 mol of isothiocyanate.

It is extremely surprising that the reaction should take place distinctly along the lines inidcated, because it is known that salt-like heterocyclic compounds are formed when isothiocyanates are chlorinated in the presence of isocyanates (cf. Belgian patent application No. 712,734). The chlorothiadiazolinones which can be obtained by the process according to the invention are new. They correspond to the general formula:

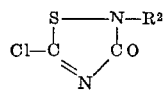

in which $R^2$ represents an optionally halogen-substituted alkyl, cycloalkyl or aralkyl radical or an aryl radical optionally substituted by halogen atoms, or by nitro, alkyl, halogenoalkyl or alkoxy radicals.

They are used as intermediates for the production of plant protection agents and may also be directly used as plant protection agents, especially as herbicides and fungicides, as shown in the following:

Fusicladium test (apple scab)/protective

Solvent: 4.7 parts by weight of acetan
Emulsifier: 0.3 part by weight of alkylaryl polyglycol ether
Water: 95 parts by weight.

The quantity of active ingredient required for the desired active ingredient concentration in the spraying liquid is mixed with the indicated quantity of solvent and the concentrate is diluted with the specified quantity of water containing the aforementioned additives.

Young apple plants at the 4 to 6-leaf stage are sprayed with the spraying liquid until they have been thoroughly moistened. The plants are then kept in a greenhouse for 24 hours at 20° C./70% relative humidity. They are then inoculated with an aqueous conidium suspension of apple-scab promoter (*Fusicladium dendriticum* Fckl.) and incubated for 18 hours in a moist chamber at 18 to 20° C./100% relative humidity.

The plants are then stored for 14 days in a greenhouse.

15 days after inoculation, the effect upon the seedlings is determined by comparison with the untreated but similarly inoculated control plants. 0% represents no effect, 100% means that the effect is as serious as in the control plants.

The active ingredients, active ingredient concentrations and results are set out in the following table:

TABLE.—FUSICLADIUM TEST/PROTECTIVE

| Active ingredient | Effect in percent [1] |
|---|---|
| 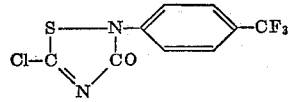 | 52 |

[1] The effect upon untreated controls with an active ingredient concentration (in percent) of 0.025.

The other compounds obtainable by the process also have a comparable fungicidal activity.

EXAMPLE 1

(a) 106 g. of chlorine (1.5 mols) are introduced at 0 to 10° C. into a mixture of 154 g. of methoxymethyl isothiocyanate (1.5 mols) and 179 g. of phenyl isocyanate (1.5 mols) in 500 ml. of carbon tetrachloride. The mixture is then heated to 20° C. and left to react at room temperature, the temperature being kept below 30° C. by occasional cooling. After the reaction has abated, the product is stirred for two hours at 30 to 40° C., cooled, filtered off from the precipitate under suction and washed with carbon tetrachloride. Recrystallisation from dioxan gives 229 g. of 5-chloro-3-oxo-2-phenyl-1,2,4-thiadiazoline of the formula:

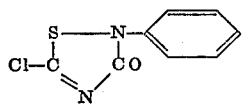

in the form of colourless crystals melting at 132 to 133° C.

Analysis.—Calculated (percent): C, 45.2; H, 2.4; Cl, 16.7; N, 13.2; S, 15.1. Found (percent): C, 45.2; H, 2.5; Cl, 16.3; N, 13.0; S, 15.3.

(b) 11 g. of chlorine are introduced at −5 to 0° C. into a mixture of 38.5 g. of dodecyloxymethyl isothiocyanate (0.15 mol) and 18 g. of phenyl isocyanate (0.15 mol). The mixture is stirred for 3 hours at room temperature, cooled to 0° C. and filtered off from the precipitate under suction. 17 g., M.P. 128–129° C.; IR-spectroscopically identical with (a).

The following compounds are obtained in the same way as in 1(a).

| Isocyanate | Chlorothiadiazolinone | M.P., °C. |
|---|---|---|
| 4-bromophenyl isocyanate. | 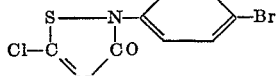 | 204–206 |
| 4-chlorophenyl isocyanate. | 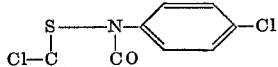 | 203–204 |
| 4-ethoxyphenyl isocyanate. | 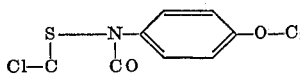 | 118–119 |
| 3-trifluoromethylphenyl isocyanate. |  | 111–112 |
| 3,4-dichlorophenyl isocyanate. | 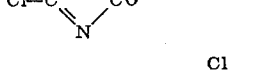 | 187–188 |
| 3-methyl-4-chlorophenyl isocyanate. | 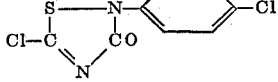 | 174–175 |
| Methyl isocyanate. | 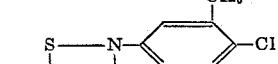 | 98–100 |
| Isopropyl isocyanate. | 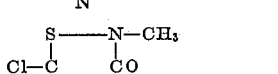 | 71–72 |
| 2,3-dichloropropyl isocyanate. | 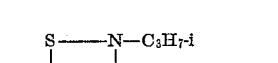 | Oil |
| Cyclohexyl isocyanate. |  | 107–109 |

EXAMPLE 2

27 g. of sulphuryl chloride (0.2 mol) are added dropwise at 0 to 10° C. to a mixture of 23 g. of 1-methoxyethyl isothiocyanate (0.2 mol) and 44 g. of 3-chloro-4-trifluoromethylphenyl isocyanate (0.2 mol). The mixture is then heated to 20° C. and left to react at room temperature. After 6 hours, precipitation is completed with petroleum ether, followed by suction filtration and washing with a little carbon tetrachloride. 5-chloro-3-oxo-2-(3'-chloro-4'-trifluoromethylphenyl)-1,2,4-thiadiazoline of the formula:

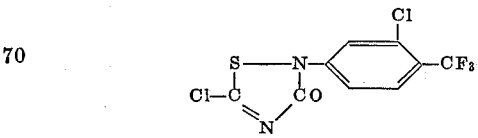

is obtained in a yield of 20 g. in the form of colourless crystals melting at 107–109° C.

EXAMPLE 3

36.5 g. of chlorine are introduced at −5 to 0° C. into a mixture of 58.5 g. of ethoxymethyl isothiocyanate (0.5 mol) and 93.5 g. of 4-trifluoromethylphenyl isocyanate (0.5 mol) in 300 ml. of carbon tetrachloride. The mixture is then stirred for 30 minutes without cooling, after which it is heated to 30° C. (internal temperature rises to 50° C.). After 4 hours, the product is filtered off from the precipitate. Recrystallisation from toluene gives 108 g. of 5 - chloro - 3-oxo-(4'-trifluoromethylphenyl)-1,2,4-thiadiazoline of the formula:

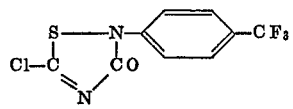

in the form of colourless crystals melting at 137–138° C.

*Analysis.*—Calculated (percent): C, 38.6; H, 1.4; Cl, 12.4; H, 10.0; S, 11.4. Found (percent): C, 38.8; H, 1.9; Cl, 12.6; H, 10.1; S, 11.4.

What we claim is:

1. A chlorothiadiazolinone of the formula:

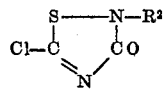

where $R^2$ is selected from the group of
alkyl having from 1 to 18 carbon atoms;
cycloalkyl having from 5 to 7 carbon atoms;
aralkyl having from 1 to 4 carbon atoms in the aliphatic portion and from 6 to 10 carbon atoms in the aromatic portion;
the foregoing alkyl, cycloalkyl, and aralkyl radicals substituted by halogen;
phenyl;
naphthyl; and
the foregoing phenyl and naphthyl radicals substituted by one or more from the group of halogen, alkyl having 1 to 12 carbon atoms, trichloromethyl, trifluoromethyl, alkoxy having from 1 to 4 carbon atoms and nitro.

2. A compound according to claim 1 having the formula 5-chloro-3-oxo-2-phenyl-1,2,4-thiadiazoline.

3. A compound according to claim 1 having the formula 5 - chloro-3-oxo-2-(3',4'-dichlorophenyl)-1,2,4-thiadiazoline.

4. A compound according to claim 1 having the formula 5 - chloro - 3-oxo-2-(4'-trifluoromethylphenyl)-1,2,4-thiadiazoline.

5. A compound according to claim 1 having the formula 5 - chloro - 3 - oxo - 2-(4'-bromophenyl)-1,2,4-thiadiazoline.

6. A compound according to claim 1 having the formula 5 - chloro - 3 - oxo - 2-(4'chlorophenyl)-1,2,4-thiadiazoline.

7. A compound according to claim 1 having the formula 5 - chloro - 3 - oxo - 2 - (4'-ethoxyphenyl)-1,2,4-thiadiazoline.

8. A compound according to claim 1 having the formula 5 - chloro - 3 - oxo-2-(3'-trifluoromethylphenyl)-1,2,4-thiadiazoline.

9. A compound according to claim 1 having the formula 5 - chloro - 3-oxo-2-(3'-methyl-4'-chlorophenyl)-1,2,4-thiadiazoline.

10. A compound according to claim 1 having the formula 5-chloro-3-oxo-2-methyl-1,2,4-thiadiazoline.

11. A compound according to claim 1 having the formula 5-chloro-3-oxo-2-isopropyl-1,2,4-thiadiazoline.

12. A compound according to claim 1 having the formula 5-chloro-3-oxo-2-(2',3'-dichloro-n-propyl)-1,2,4-thiadiazoline.

13. A compound according to claim 1 having the formual 5-chloro-3-oxo-2-cyclohexyl-1,2,4-thiadiazoline.

14. A compound according to claim 1 having the formula 5 - chloro-3-oxo-2-(3'-chloro-4'-trifluoromethylphenyl)-1,2,4-thiadiazoline.

15. A process for the production of chlorothiadiazolinones wherein a mixture of and isocyanate having the general formula

wherein $R^2$ is selected from the group of
alkyl having from 1 to 18 carbon atoms;
cycloalkyl having from 5 to 7 carbon atoms;
aralkyl having from 1 to 4 carbon atoms in the aliphatic portion and from 6 to 10 carbon atoms in the aromatic portion;
the foregoing alkyl, cycloalkyl and aralkyl radicals substituted by halogen;
phenyl;
naphthyl; and
the foregoing phenyl and naphthyl radicals substituted by one or more from the group of halogen; alkyl having 1 to 12 carbon atoms, trichloromethyl trifluoromethyl, alkoxy having from 1 to 4 carbon atoms and nitro, and
an isothiocyanate of the formula:

in which
R is selected from the group of alkyl, aralkyl, cycloalkyl and the foregoing substituted by halogen;
$R^1$ is hydrogen or is selected from the group of alkyl, haloalkyl, phenyl and phenyl substituted by one or more from the group of lower alkyl, lower alkoxy and halogen,
is reacted with elementary chlorine or a chlorine donor at a temperature of from −20 to +100° C.

16. A process according to claim 15 wherein the reaction is carried out in an inert organic solvent.

17. A process according to claim 15 wherein the chlorine-donor is selected from the group of sulphuryl chloride and phosphorus pentachloride.

18. A process according to claim 15 wherein the reaction is carried out at a temperature of from 0 to 30° C.

References Cited

UNITED STATES PATENTS 3,398,134  8/1968  Ball et al. _____ 260—302

OTHER REFERENCES

Narayanan et al.: Chem. Abstracts, 66:65479v (1967).

ALEX MAZEL, Primary Examiner

R. J. GALLAGHER, Assistant Examiner

U.S. Cl. X.R.

71—90; 200—454; 424—270